(12) United States Patent
Liu

(10) Patent No.: US 12,519,323 B2
(45) Date of Patent: Jan. 6, 2026

(54) DC/DC CONVERTER FOR DISTRIBUTED STORAGE AND SOLAR SYSTEMS

(71) Applicant: Nextracker LLC, Fremont, CA (US)

(72) Inventor: Yang Liu, Mountain View, CA (US)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 18/481,635

(22) Filed: Oct. 5, 2023

(65) Prior Publication Data

US 2024/0030725 A1 Jan. 25, 2024

Related U.S. Application Data

(63) Continuation of application No. 17/202,331, filed on Mar. 15, 2021, now Pat. No. 11,804,721, which is a continuation of application No. 15/965,108, filed on Apr. 27, 2018, now Pat. No. 10,951,040.

(51) Int. Cl.
*H02J 7/00* (2006.01)
*G05B 19/045* (2006.01)
*H02J 3/38* (2006.01)

(52) U.S. Cl.
CPC .......... *H02J 7/0018* (2013.01); *G05B 19/045* (2013.01); *H02J 3/38* (2013.01); *H02J 3/381* (2013.01); *G05B 2219/24136* (2013.01); *G05B 2219/25361* (2013.01); *H02J 2300/26* (2020.01)

(58) Field of Classification Search
CPC .................................................. H02J 7/0018
See application file for complete search history.

(56) References Cited

U.S. PATENT DOCUMENTS

| 8,159,178 | B2 | 4/2012 | Serban |
| 10,008,854 | B2 | 6/2018 | Zimmanck |
| 2011/0043160 | A1 | 2/2011 | Serban |
| 2011/0140520 | A1 | 6/2011 | Lee |
| 2013/0328397 | A1 | 12/2013 | Lee |
| 2016/0248253 | A1 | 8/2016 | Zimmanck |

(Continued)

FOREIGN PATENT DOCUMENTS

| CN | 103227475 A | 7/2013 |
| CN | 103545905 A | 1/2014 |

(Continued)

OTHER PUBLICATIONS

PCT Search Report and Written Opinion issued in corresponding PCT Application No. PCT/US19/28176 dated Sep. 4, 2019, 15 pages.

(Continued)

*Primary Examiner* — Robert Grant
(74) *Attorney, Agent, or Firm* — Fredrikson & Byron, P.A.

(57) ABSTRACT

A multi-power distributed storage system including a first power source; a second power source electrically connected to a common bus with the first power source; a single input port inverter electrically connected to the common bus. The system including a controller configured to communicate with at least the second power source, and the single input port inverter. The second power source including a plurality of battery banks and a plurality of bi-directional DC/DC converters configured to charge and discharge the plurality of battery banks and provide DC to the single input port inverter.

15 Claims, 6 Drawing Sheets

(56) References Cited

U.S. PATENT DOCUMENTS

| | | | |
|---|---|---|---|
| 2016/0254672 A1* | 9/2016 | Yoscovich | H02M 7/44 307/77 |
| 2017/0077709 A1 | 3/2017 | Kim et al. | |
| 2017/0288184 A1 | 10/2017 | Schnakofsky et al. | |
| 2017/0310120 A1* | 10/2017 | Birkl | H02J 7/00041 |
| 2018/0076732 A1 | 3/2018 | Yoscovich et al. | |
| 2018/0301904 A1 | 10/2018 | Zimmanck | |
| 2018/0337385 A1 | 11/2018 | Schnakofsky | |

FOREIGN PATENT DOCUMENTS

| | | |
|---|---|---|
| CN | 106505616 A | 3/2017 |
| CN | 107394829 A | 11/2017 |
| WO | 2013163350 A1 | 10/2013 |

OTHER PUBLICATIONS

Extended European search report issued in European Patent Application No. 19792495.4 dated Apr. 11, 2022, 7 pages.

Examination report No. 2 issued in Australian Patent Application No. 2019260587 dated Jun. 11, 2021, 4 pages.

Invitation pursuant to Rule 63(1) EPC issued in European Patent Application No. 19792495.4 dated Dec. 7, 2021.

Examination Report No. 2 issued in Australian Application No. 2021257945 dated Oct. 19, 2022, 5 pages.

Examination Report No. 1 issued in Australian Application No. 2019260587 dated Apr. 8, 2021, 5 pages.

Mishra et al., "Single-phase synchronverter for a grid-connected roof top photovoltaic system", The Institution of Engineering and Technology Renewable Power Generation, vol. 10, Iss. 8, Apr. 19, 2016, pp. 1187-1194.

Hernandez et al., "Enhanced Utility-scale photovoltaic units with frequency support functions and dynamic grid support for transmission systems", The Institution of Engineering and Technology Renewable Power Generation, vol. 11 Iss. 3, Jan. 9, 2017, pp. 361-372.

European Patent Office, "Extended European Search Report", From Application No. 24209554.5, Dated Feb. 6, 2025, pp. 11.

* cited by examiner

DC/DC CONVERTER FOR DISTRIBUTED STORAGE AND SOLAR SYSTEMS

CROSS-REFERENCE TO RELATED APPLICATIONS

This application is a continuation of U.S. patent application Ser. No. 17/202,331 filed Mar. 15, 2021, which is a continuation of U.S. patent application Ser. No. 15/965,108 filed Apr. 27, 2018, now U.S. Pat. No. 10,951,040, issued Mar. 16, 2021, the entire contents of each of which are incorporated herein by reference.

TECHNICAL FIELD

The present disclosure relates to dual power systems and methods for distributed storage and solar systems. More particularly, the present disclosure is directed to solar systems, and more particularly solar tracking systems and the control systems and algorithms for switching between solar power and battery power to drive an energy grid.

BACKGROUND

There have been developed a number of solutions for power source control in dual and multi-source power systems. In the solar tracker scenario there have been developed certain control systems. One of these control systems determines the source of the power to be applied to a load such as a power grid. While one source is the power generated by a solar power array the second is often a battery system.

There are times when the energy produced by the solar power plant is insufficient to supply to the grid. This may occur when the sun is obscured by clouds or demand is such that the solar power plant cannot generate sufficient power to supply an energy grid. In these types of instances, a DC storage plant is employed to provide additional power. As will be appreciated, the ability to switch or combine the energy from the two power providing systems (i.e., the solar power plant and the DC storage plant) is an important feature of any such system. Though there have been developed systems enabling this transition, there is always a need for improved and more efficient systems.

FIG. 6 depicts a prior art multi input port inverter solar tracker system 600. This architecture for DC coupling solar and storage utilizes a multi input port inverter 630. The multi input port inverter 630 manages solar array 610, following the maximum power point tracking (MPPT) algorithm, and battery 620 charging and discharging separately for distributed and large applications. The solar array 610 to battery 620 ratio is determined by the specific situation for every installation. Typically the multi input port inverter 630 will be oversized to meet large power requests from the grid and the responses from the solar array 610 or battery 620. Correlation between the central multi input port inverter 630 and battery charger 625 can be complicated and communication delay also limits this configuration for fast response micro-grid applications.

Accordingly, in view of these short comings, improved solutions with greater efficiency and higher speed are desired.

SUMMARY

Embodiments of the present disclosure are described in detail with reference to the drawing figures wherein like reference numerals identify similar or identical elements.

An aspect of the present disclosure provides a method for implementing a multi-power distributed power storage and generation system. The method includes feeding a single input port inverter an output voltage from a solar power plant and a DC storage plant via a common bus, the DC storage plant including a plurality of bi-directional DC/DC converters configured to charge and discharge a plurality of battery banks, maintaining constant power output of the DC storage plant in an MPPT region of the solar power plant for a given load using the power droop method, ramping down an output power of the DC/DC converters when a bus voltage is higher than the MPPT region, ramping up an output power of the DC/DC converters when a bus voltage is higher than the MPPT region, and maintaining maximum power output of the solar power plant, wherein the ramping up and ramping down of an output power is achieved, at least initially, without active control of the DC/DC converters.

In one aspect, the method also includes monitoring with a controller a power demand of a load, monitoring with the controller a DC charging state battery health state of the DC storage plant, monitoring with the controller the output power and voltage of the solar power plant, and when the load demand is stabilized, the controller determines which of the plurality of battery banks are to supply output power to the bus.

Another aspect of the present disclosure provides a multi-power distributed storage system including a first power source, a second power source electrically connected to a common bus with the first power source, a single input port inverter electrically connected to the common bus, and a controller configured to communicate with at least the second power source, and the single input port inverter. The second power source includes a DC storage plant including a plurality of battery banks and a plurality of bi-directional DC/DC converters configured to charge and discharge the plurality of battery banks and when a grid power curtailment command is received at the single input port inverter the bus voltage rises, and both the first and second power sources reduce output power without an active control, and wherein as load increases, the bus voltage lowers and both the first and second power sources increase output power without an active control.

In a further aspect, the first power source includes a solar power plant. In another aspect, the solar power plant utilizes MPPT to maintain maximum output power. In another aspect, the solar power plant includes a plurality of solar modules.

In yet a further aspect of the disclosure, the DC storage plant includes a controller including at least one processor, and a memory having stored thereon instructions which, when executed by the at least one processor, communicate with the bi-directional DC/DC converters to adjust the battery banks supplying power to the bus. Still further aspects describe every battery bank is separately managed.

In one aspect the batteries supply power to the bus to maintain the shape of the PV power curve, allowing the single input port inverter to operate at MPPT. In one aspect the controller further maintains the operating state of charging of the DC storage plant at or above a minimum level of charge.

In another aspect of the present disclosure provides a method for implementing a multi-power distributed power storage system. The method includes feeding a single input port inverter an output voltage from a first power source and a second power source including a plurality of converters, maintaining constant power output of the DC storage plant in an MPPT region of the solar power plant for a given load using the power droop method, ramping down an output power of the DC/DC converters when a bus voltage is higher than the MPPT region, ramping up an output power of the DC/DC converters when a bus voltage is higher than the MPPT region, and maintaining maximum power output of the single input port inverter. The ramping up and ramping down of an output power is achieved, at least initially, without active control of the DC/DC converters.

In yet another aspect the first power source includes a solar power plant. In a further aspect the second power source includes a DC storage plant. In yet a further aspect the plurality of converters includes a bi-directional DC/DC converter.

BRIEF DESCRIPTION OF THE DRAWINGS

Various aspects of the present disclosure are described herein below with reference to the drawings, which are incorporated in and constitute a part of this specification, wherein.

DETAILED DESCRIPTION

The present disclosure is directed to systems and methods for implementing a multi-power and distributed power storage system whereby a single load may be driven by two separate power sources, both individually and together. Though described generally herein in the context of a solar tracking system that utilizes both a photovoltaic (solar) power plant and a DC storage plant to provide energy to drive an energy grid, the systems, schematics, and algorithms described herein in any situation where there is are two power sources. In particular the systems and algorithms of the present disclosure are useful where there is one power source that is the preferred power source to be utilized but the system should experience little to no lag in transitioning to the other power source.

Typically a photovoltaic power plant is connected to a large power grid, and may be associated with large battery banks that can be used to provide power to the grid when the solar panels are unable to meet demand. Commonly owned U.S. Pat. Pub. 2017/0288184 entitled "Standard energy storage container platform," filed Mar. 31, 2017 and teaches a battery container and U.S. patent application Ser. No. 15/872,071 entitled "Direct Current Battery String Aggregator for Standard Energy Storage Enclosure Platform," teaches a controller and system for connecting a battery and photovoltaic system to an energy grid. Both references are incorporated herein by reference. Other dual power source energy systems requiring monitoring and switching between energy supply systems are also contemplated within the scope of the present disclosure.

Figure 1:
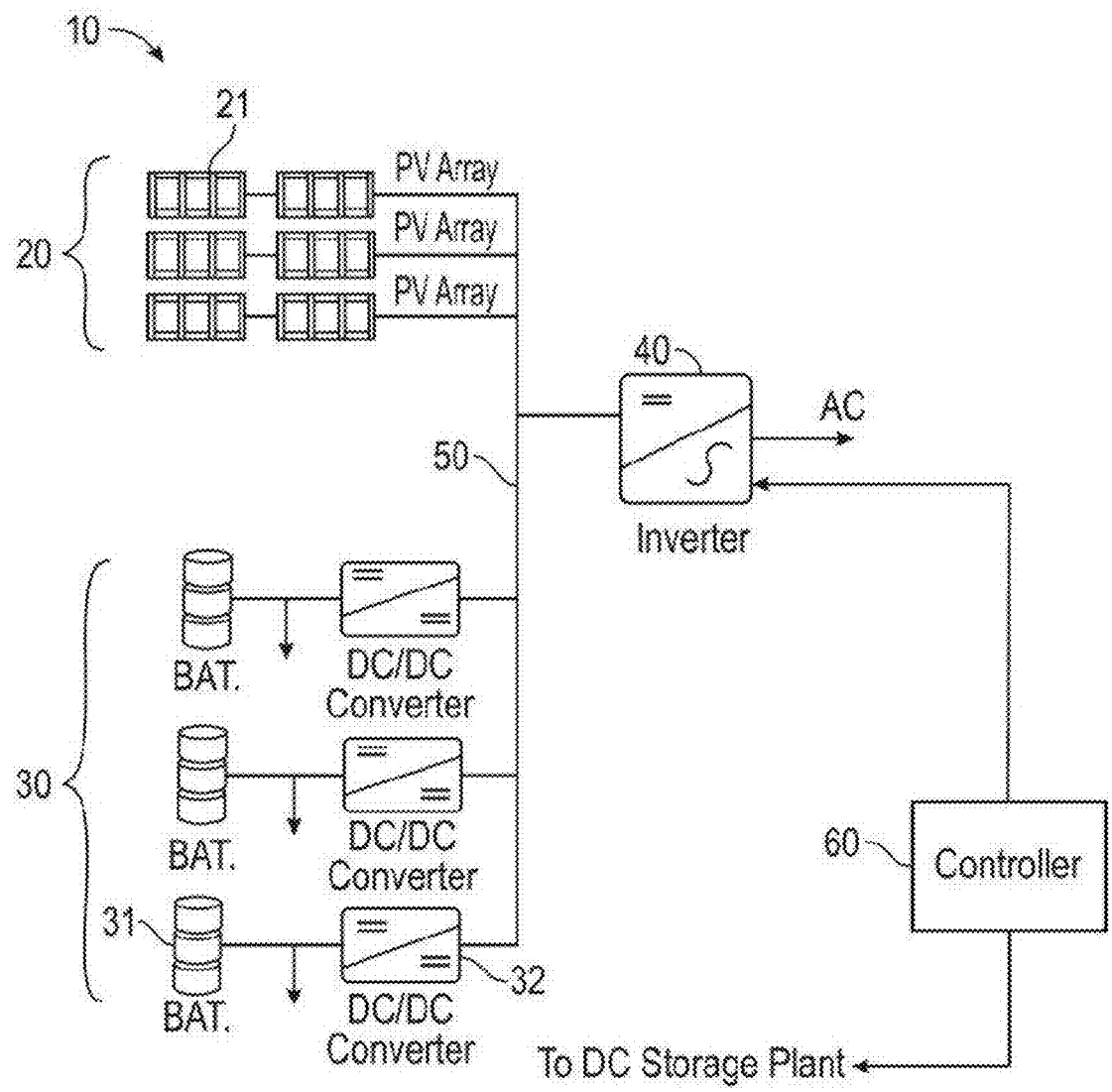
FIG. 1 depicts a dual source power plant in accordance with the present disclosure.

FIG. 1 depicts a distributed solar and storage system 10 which may be deployed as part of a larger array. It is contemplated that this application could be utilized for solar tracker systems, fixed tilt solar systems, roof top solar, and any type of solar array. Each distributed solar and storage system 10 includes a single input port inverter 40 which is fed an output voltage from a first power source such as a solar power plant 20, and from a second power source such as a DC storage plant 30, by way of a common bus 50. Other types of power sources are contemplated such as steam, nuclear, geo-thermal, hydro-electric, wind, etc. It is contemplated that more than two power sources can be utilized. The single input port inverter 40 can be sized for the AC output requirements of the grid to which it is connected. The common bus 50 allows for near instantaneous response to changes in the system power requirements.

The DC storage plant 30 typically includes a plurality of battery banks 31, bi-directional DC/DC converters 32, and a controller 60. The controller 60 can govern the charge and discharge rate. The bi-directional DC/DC converters 32 can be configured to charge the battery banks 31. The bi-directional DC/DC converters 32 can be sized to the battery output or input. Every battery bank 31 and DC/DC converter 32 is separately managed. The bi-directional DC/DC converters 32 employ a power droop algorithm which maintains constant power output in the normal MPPT region. When the voltage is higher or lower than the MPPT region, a bi-directional DC/DC converter 32 could ramp up power or ramp down power output to the bus 50. The power droop algorithm enables local control of power output from the DC power plant 30 based on the external load. Additionally internal resistance of the parallel connected bi-directional DC/DC converters 32 maintains relatively equal current sharing between the battery banks 31. The power droop algorithm, in combination with the battery banks 31 and the photovoltaic panel arrays 21 sharing a common bus 50 eliminates the need for additional communication and allows for a fast response to micro-grid applications (e.g., changes in load on the inverter 40).

The single input port inverter 40 receives power from the common bus 50 and converts it to an AC voltage. The single input port inverter 40 can be sized for the AC output requirements of the distributed solar and storage system 10. The single input port inverter 40 maintains the output power at the Maximum Power Point (MPP) by using, for example, the voltage tracking method. It is contemplated that other methods known in the art can be used. Maximum Power Point Tracking (MPPT), which is the process of finding the keeping the load characteristic at the point where the system is optimized to give the highest power transfer, is run at the input port of the single input port inverter 40. The output power from the solar plant is sampled and the proper load characteristic (resistance) is applied so as to obtain maximum power. When a grid curtailment command arrives at the solar power plant 20 and the DC storage plant 30, the single input port inverter 40 experiences a rise in system voltage at the bus 50, and both the solar power plant 20 and the DC storage plant 30 reduce power output without active control. Similarly, in an increasing load scenario, the single input port inverter 40 experiences a drop in system voltage at the bus 50, and both the solar power plant 20 and the DC storage plant 30 increases power output without an active control. These changes in voltage are near instantaneous at the single input port inverter 40.

Figure 2:
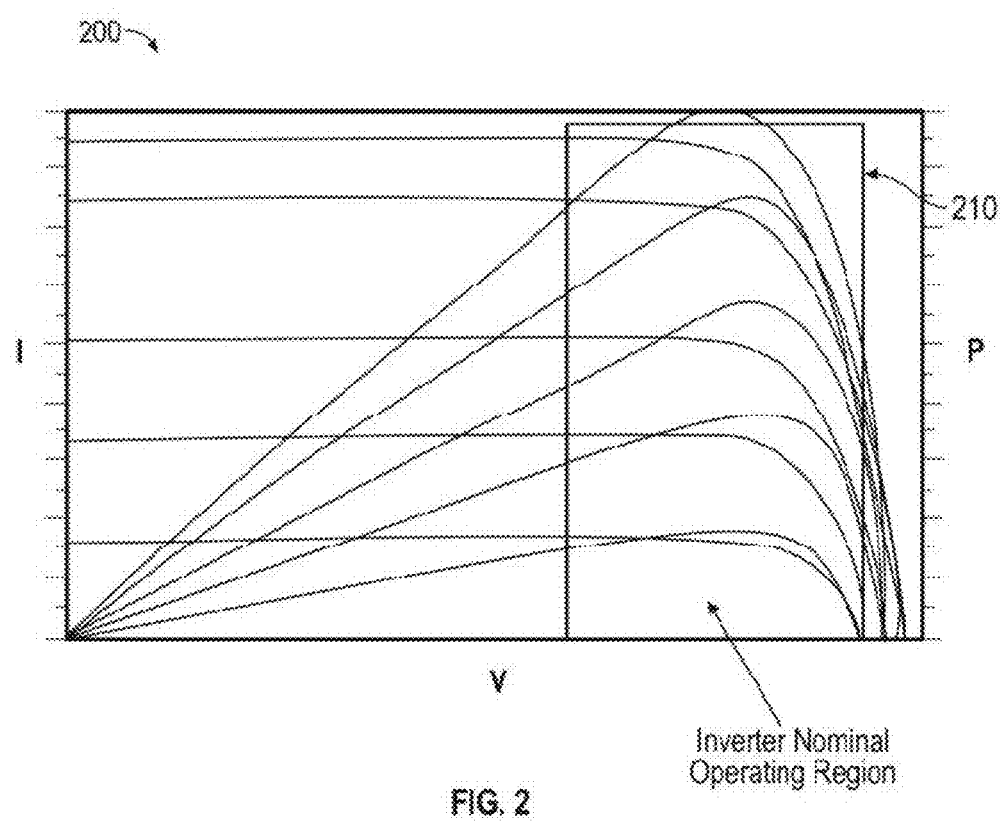
FIG. 2 depicts a MPPT graph of a dual source power plant in accordance with the present disclosure.

As can be seen in FIG. 2, as the system voltage increases beyond MPPT, the power and current output drop dramatically with the rise in voltage. In parallel with this drop in power and current, the controller 60 can communicate with the individual bi-directional DC/DC converters to manage the output of each of the individual battery banks 31 to achieve the same power and current output in a more efficient manner and in accordance with the health and states of charge of each of the individual battery banks 31 as described in greater detail below. It is contemplated that the battery banks 31 and DC/DC converters 32 are separately managed. The single input port inverter 40 is thus able to maintain power output of the solar power plant 20 and the DC storage plant 30 in the MPPT region.

FIG. 2 depicts a graph 200 depicting the MPPT region of a distributed solar and storage system 10 in accordance with the present disclosure. MPPT can be implemented generally to sources with variable power. The graph 200 depicts a series of V/I and P/V curves. To achieve maximum solar energy, the photovoltaic panel arrays 21 of the solar power plant 20 are equipped with a system for calculating and maintaining MPPT. As demonstrated by the graph 200 as the amount of sunlight varies, the load characteristic which provides the maximum power transfer efficiency also changes. By changing the load and supply characteristic, the power transfer can be kept at a point of high efficiency. The distributed solar and storage system 10 depicted in FIG. 1 will operate such that the single input port inverter 40 can operate within the MPPT region, and simply add or shed supplied power in response to the demand.

Figure 3:
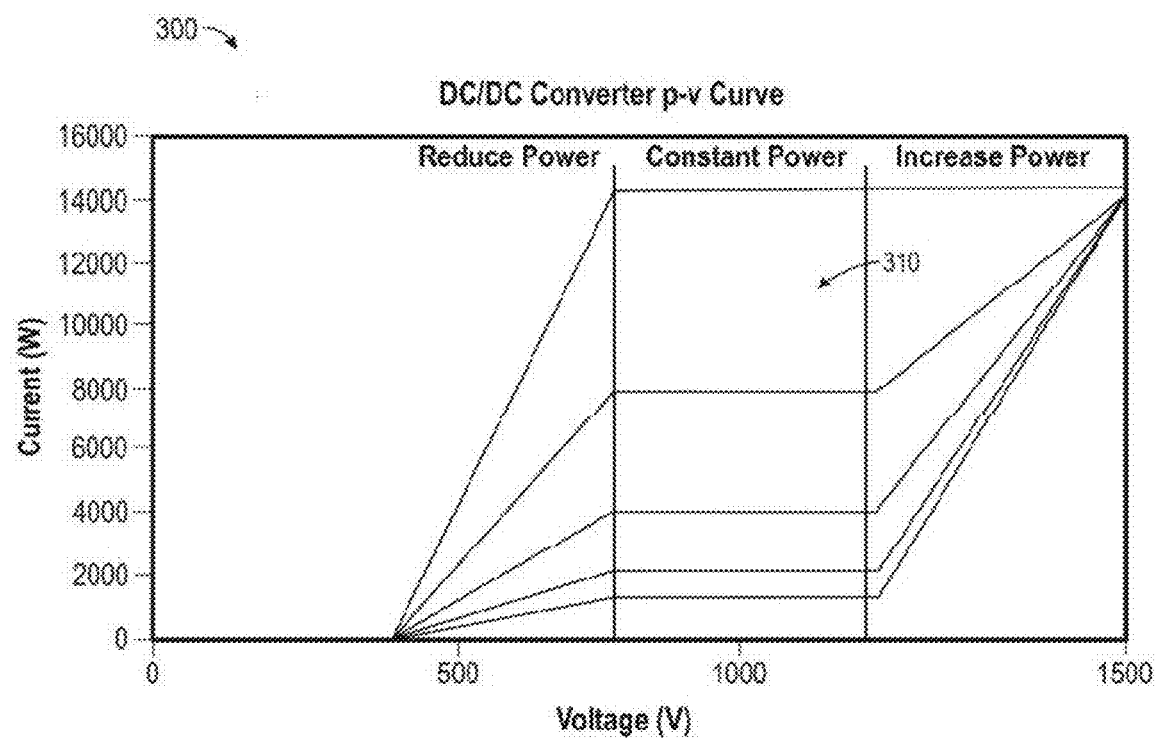
FIG. 3 depicts a graph of the DC/DC Converter Output Curve for a battery back-up portion of a dual source power plant in accordance with the present disclosure.

FIG. 3 depicts a graph of bi-directional DC/DC converter output curve 300 in accordance with the present disclosure. The curve depicts output power vs voltage. The power droop algorithm employed by the bi-directional DC/DC converters 32 and inverter 40 maintains the output at a relatively constant power. As shown in the graph 300 a constant power region 310 depicts the power output of the DC/DC converters 32 at a given voltage. Though relatively constant, a droop in power is depicted as the voltage increases. The constant power region 310 of the graph 300 substantially overlaps the MPPT region 210 of FIG. 2. When the common bus's 50 output voltage is higher than the MPPT region, the bi-directional DC/DC converter can automatically react and increase its output voltage, as depicted in FIG. 3, to a point higher than the MPPT region depicted in FIG. 2. When the common bus's 50 output voltage is lower than the MPPT region, the bi-directional DC/DC converter can automatically react and the output power can be ramped up. This allows the bi-directional DC/DC converters 32 to respond changes in load automatically as a result of changes in current drawn from the battery banks 31 to maintain the inverter 40 at or near MPPT at all times.

As the voltage increases, and the power delivered from the battery banks 31 through the bi-directional DC/DC converters 32 drops, the controller 60, though lagging the near instantaneous response caused by the changes in bus 50 voltage caused by the change in load, is able to communicate with the bi-directional DC/DC converters to adjust how that reduced or increased power is being delivered to the common bus 50. That is the controller can adjust which battery banks 31 are actually feeding the common bus 50. In this way, controller can remove battery banks 31 from the common bus 50 to both adjust the delivered power, and to reduce the bus voltage, shifting the operating point of the inverter 40 to within the inverter nominal operating region, and to a more efficient point on the MPPT curves depicted in FIG. 2. As will be appreciated, this also works in reverse as a load is added to the inverter 40. As load increases on the common bus 50, the voltage as observed in connection with the power droop curve of FIG. 3 will drop, and the bi-directional DC/DC converters will recognize that they are outside of the constant power region and additional battery banks 31 will connect to the common bus 50. While some number of battery banks 31 will be able to automatically connect to the common bus 50 based on their state of charge, other battery banks 31 may have received communication from the controller preventing their further discharge until achieving some level of charge (e.g., 80% of maximum capacity) before being permitted to discharge.

Generally, the response to load by the bi-directional DC/DC converters 32 both connecting to or separating from the common bus 50 is initially driven by the bus voltage. Secondarily it is driven by the controller 60 to manage more directly which battery banks 31 and bi-directional DC/DC converters 32 are supplying power to the common bus 50 and inverter 40 or are being charged by the solar power plant 20.

Figure 4:
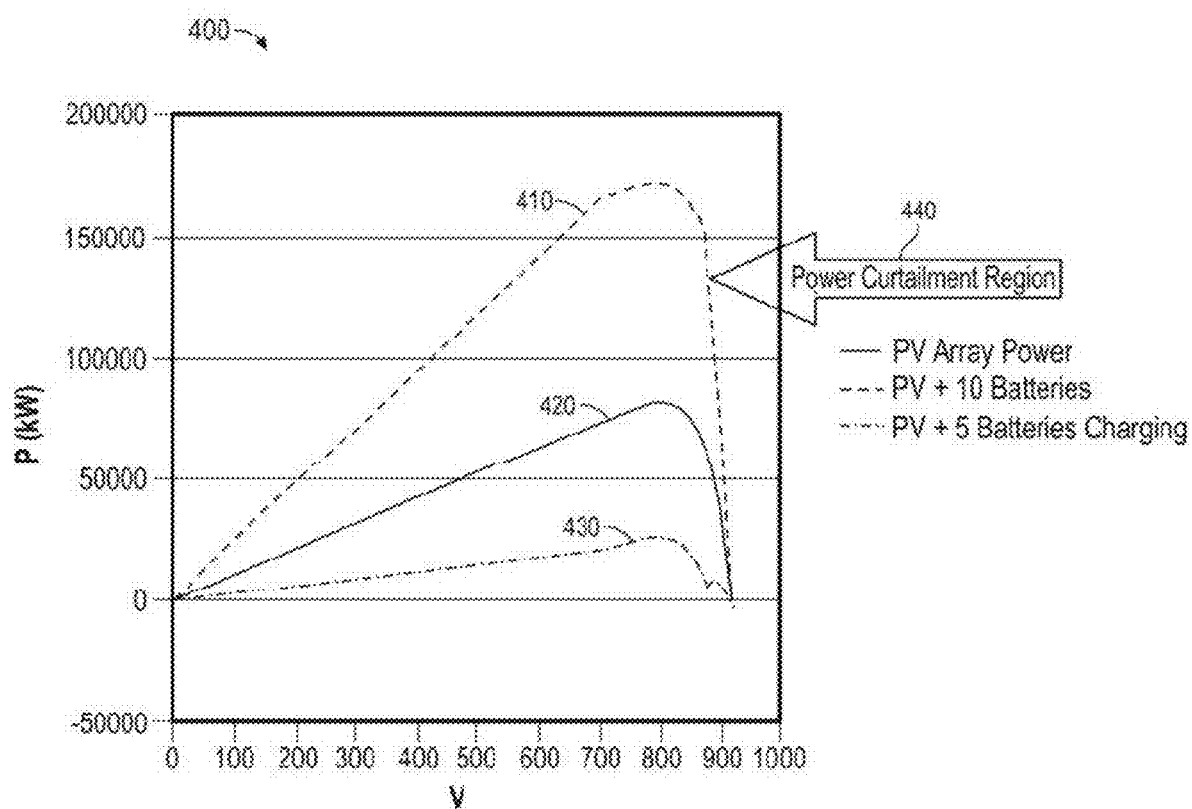
FIG. 4 depicts a graph of grid demand response of a dual source power plant in accordance with the present disclosure.

FIG. 4 depicts a graph of grid demand response 400 in accordance with the present disclosure. In an embodiment, for example, an 80 kW solar power plant and ten 10 kW batteries sharing the common bus 50 could have all the battery banks 31 running full discharge as in the top trace in the graph 400. As the voltage increases, so does the output power, as the system 10 maintains output power in the MPPT region as depicted in FIG. 2. By turning off all of the batteries 31, only the solar power plant 20 would remain providing power to the grid, as in the middle trace 420. If for example, half of the battery banks 31 needed charging the curve would follow the lower trace 430. In all of the above cases, the distributed solar and storage system 10 would attempt to remain operating in the MPPT region as depicted in FIG. 2, such that the single input port inverter 40 will still be able to provide maximum power. If the single input port inverter 40 voltage rises past the MPPT region and into the power curtailment region of the graph 400 in any of the above traces 410, 420, 430, the solar power plant 20 and the DC storage plant 30 will automatically respond by reducing power to the common bus 50, without the need for a command.

In another embodiment, when the AC load demand changes, it creates a change in frequency, which will translate as a change in bus voltage on the input side of the single input port inverter 40. When the grid frequency is low, and there is a need for frequency support, the single input port inverter 40 will reduce the system voltage on the common bus 50 to search for the system maximum power.

Figure 5:
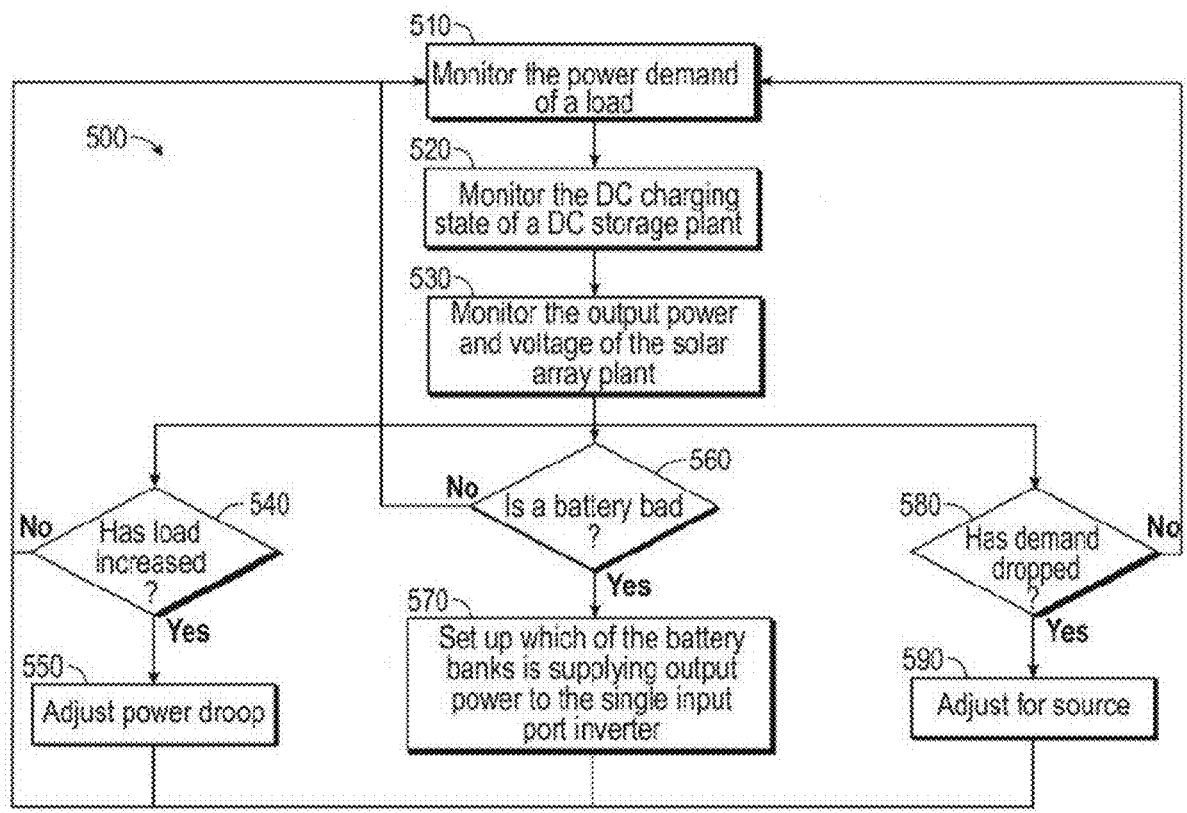
FIG. 5 depicts a logic flow for a control algorithm in accordance with the present disclosure.
Figure 6:
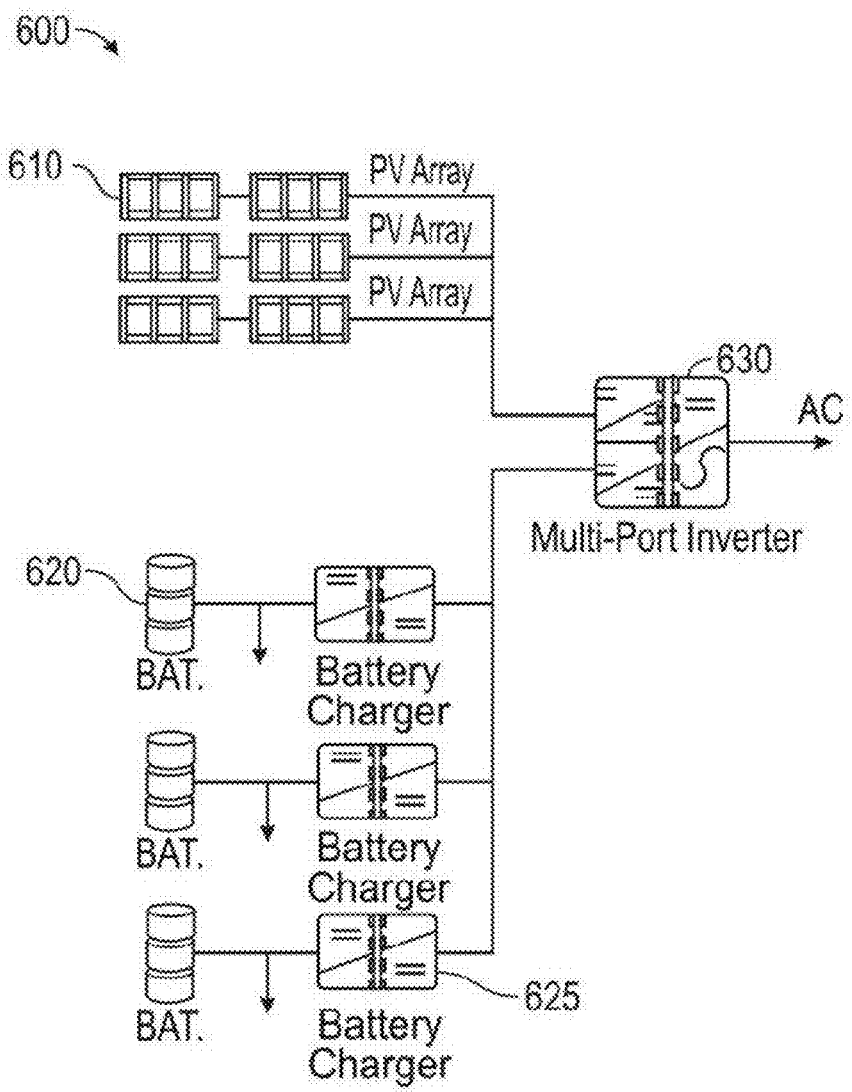
FIG. 6 depicts a prior art multi-input port inverter system in combination with a dual source power plant.

FIG. 5 depicts a logic flow for a control algorithm in accordance with the present disclosure. In one embodiment, the system controller 60 can monitor the power demand of a particular load at step 510. The controller 60 can monitor the DC charging state of the DC storage plant 30 at step 520, and monitor the output power and voltage of the solar power plant 20 at step 530. In another embodiment, based on the monitoring, the controller 60 can detect whether the load has increased 540, and after the load has stabilized, the controller 60 can adjust at step 550 the power available from the DC storage plant 30 in accordance with the power droop algorithm. In yet another embodiment, based on the monitoring steps 510, 520, and 530, the controller 60 can detect or receive communications indicating at step 560 that there are one or more bad batteries in a battery bank 31. In a DC storage plant 30, a bad battery can cause the entire battery bank 31 to be bad and thus unavailable for meeting load demands safely. Thus, in step 570 the controller can switch the affected battery bank 31 off, preventing it from being employed to respond to changing load demands, and ensure that any battery bank 31 with a faulty battery is not permitted to be connected to the bus 50 and feed the inverter. It is contemplated that the controller 60 maintains the operating state of charging of the DC storage plant 30 at or above a minimum level of charge. In yet another embodiment, based on the monitoring steps 510, 520, and 530, the controller 60 can detect whether demand has dropped at step 580. Generally, the response to load by the bi-directional DC/DC converters 32 is initially driven by the bus voltage. However, when the load demand is stabilized, the controller 60 can adjust the amount of power being supplied from the DC storage plant 30. It is contemplated that any of the detecting steps 540, 560, and 580 can happen in parallel with each other.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

I claim:

1. A multi-power distributed power system comprising:
   a solar module coupled to a common bus without an intervening power converter;
   a single input port inverter coupled to the common bus; and
   an energy storage device coupled to the common bus via a DC/DC converter, the DC/DC converter configured to maintain a maximum power output of the solar module at the common bus by:
      reducing output power of the energy storage device applied to the common bus in response to an increase in a common bus voltage above a maximum power point tracking (MPPT) voltage region;
      increasing output power of the energy storage device applied to the common bus in response to a decrease in the common bus voltage below a MPPT voltage region; and
      maintaining output power of the energy storage device applied to the common bus when the common bus voltage is within a MPPT voltage region.

2. The multi-power distributed power system of claim 1, wherein:
   the energy storage device comprises a first energy storage device;
   the system comprises a plurality of energy storage devices, the plurality of energy storage devices including the first energy storage device;
   the DC/DC converter comprises a first DC/DC converter;
   the system comprises a plurality of DC/DC converters, the plurality of DC/DC converters including the first DC/DC converter;
   the plurality of energy storage devices are coupled to the common bus via the plurality of DC/DC converters.

3. The multi-power distributed power system of claim 2, further comprising a system controller in communication with the plurality of DC/DC converters and the single input port inverter, the system controller configured to:
   monitor a power demand of a load connected to the inverter; and
   adjust power supplied by the plurality of energy storage devices to the common bus.

4. The multi-power distributed power system of claim 3, wherein the system controller is further configured to:
   remove one or more of the plurality of energy storage devices from outputting power to the common bus in response to a decrease in the power demand of the load; and
   add one or more of the plurality of energy storage devices to output power to the common bus in response to an increase in the power demand of the load.

5. The multi-power distributed power system of claim 3, wherein each of the plurality of energy storage devices is separately managed.

6. The multi-power distributed power system of claim 3, wherein the system controller is further configured to maintain an operating state of charging of the energy storage devices at or above a minimum level of charge.

7. The multi-power distributed power system of claim 1, wherein the energy storage device is a battery.

8. The multi-power distributed power system of claim 1, wherein the single input port inverter is configured to operate at MPPT.

9. A method comprising:
   applying power output from a plurality of solar modules connected to a common bus to a single input port inverter, the plurality of solar modules connected to the common bus without an intervening power converter;
   applying power output from a plurality of energy storage devices connected to the common bus via a plurality of DC/DC converters to the single input port inverter;
   decreasing output power of the plurality of energy storage devices applied to the common bus using the plurality of DC/DC converters when a voltage on the common bus is greater than a voltage on the common bus when the plurality of solar modules operate in a Maximum Power Point Tracking (MPPT) region;
   increasing output power of the plurality of energy storage devices applied to the common bus using the plurality of DC/DC converters when a voltage on the common bus is less than the voltage on the common bus when the plurality of solar modules operate in the MPPT region; and
   maintaining output power of the plurality of energy storage devices applied to the common bus when the voltage on the common bus is within a range where the plurality of solar modules operate in the MPPT region.

10. The method of claim 9, further comprising maintaining a maximum output power of the single input port inverter.

11. The method of claim 9, further comprising controlling power output from the plurality of energy storage devices based on a power demand of an external load via the plurality of DC/DC converters.

12. The method of claim 11, further comprising monitoring the power demand of the external load via a system controller, the system controller in communication with at least one of the plurality of DC/DC converters and the single input port inverter.

13. The method of claim 11, further comprising removing one or more of the plurality of energy storage devices from outputting power to the common bus in response to a decrease in the power demand of the external load.

14. The method of claim 13, further comprising adding one or more of the plurality of energy storage devices to output power to the common bus in response to an increase in the power demand of the load.

15. The method of claim 9, further comprising:
monitoring states of charge of the plurality of energy storage devices;
monitoring the output power of the plurality of solar modules; and
determining which of the plurality of energy storage devices are to supply output power to the single input port inverter via the common bus based on the monitoring of the states of charge of the plurality of energy storage devices and the output power of the plurality of solar modules.

* * * * *